United States Patent
Liu et al.

(10) Patent No.: US 9,480,954 B2
(45) Date of Patent: Nov. 1, 2016

(54) HIGH SELECTIVITY EPOXYSILICONE-CROSS-LINKED POLYIMIDE MEMBRANES FOR GAS SEPARATIONS

(71) Applicant: UOP LLC, Des Plaines, IL (US)

(72) Inventors: Chunqing Liu, Arlington Heights, IL (US); Howie Q. Tran, Skokie, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/661,591

(22) Filed: Mar. 18, 2015

(65) Prior Publication Data

US 2016/0271571 A1 Sep. 22, 2016

(51) Int. Cl.
| | |
|---|---|
| *B01D 53/22* | (2006.01) |
| *B01D 71/64* | (2006.01) |
| *B01D 71/80* | (2006.01) |
| *B01D 69/08* | (2006.01) |
| *B01D 71/70* | (2006.01) |
| *B01D 69/12* | (2006.01) |

(52) U.S. Cl.
CPC .............. *B01D 71/80* (2013.01); *B01D 53/228* (2013.01); *B01D 69/088* (2013.01); *B01D 69/125* (2013.01); *B01D 71/64* (2013.01); *B01D 71/70* (2013.01); *B01D 2053/224* (2013.01)

(58) Field of Classification Search
CPC B01D 53/228; B01D 69/088; B01D 69/125; B01D 71/64; B01D 71/70; B01D 71/80; B01D 2053/224
See application file for complete search history.

(56) References Cited

U.S. PATENT DOCUMENTS

| | | | |
|---|---|---|---|
| 7,247,191 B2 | 7/2007 | Koros et al. | |
| 7,485,173 B1 | 2/2009 | Liu et al. | |
| 8,016,124 B2 | 9/2011 | Yates et al. | |
| 8,337,598 B2 | 12/2012 | Yates et al. | |
| 2005/0268783 A1 | 12/2005 | Koros et al. | |
| 2010/0181253 A1* | 7/2010 | Vandezande | B01D 53/228 210/650 |
| 2011/0277631 A1* | 11/2011 | Shao | B01D 71/64 95/51 |
| 2012/0323059 A1* | 12/2012 | Liu | B01D 53/228 585/818 |
| 2014/0033918 A1* | 2/2014 | Zheng | B01D 53/228 95/51 |
| 2014/0352534 A1* | 12/2014 | Sano | B01D 53/228 95/51 |
| 2015/0143995 A1* | 5/2015 | Umehara | B01D 53/228 96/13 |

* cited by examiner

*Primary Examiner* — Jason M Greene

(57) ABSTRACT

The present invention provides a high selectivity epoxysilicone-cross-linked polyimide membrane comprising a polyimide polymer with hydroxyl functional groups cross-linked with epoxy functional groups on epoxysilicone polymer. The present invention also provides a process for separating at least one gas from a mixture of gases using the high selectivity epoxysilicone-cross-linked polyimide membrane. The process comprises providing the high selectivity epoxysilicone-cross-linked polyimide membrane which is permeable to the at least one gas; contacting the mixture on one side of the membrane to cause the at least one gas to permeate the membrane; and removing from the opposite side of the membrane a permeate gas composition comprising a portion of the at least one gas which permeated the high selectivity epoxysilicone-cross-linked polyimide membrane.

20 Claims, No Drawings

US 9,480,954 B2

HIGH SELECTIVITY EPOXYSILICONE-CROSS-LINKED POLYIMIDE MEMBRANES FOR GAS SEPARATIONS

BACKGROUND OF THE INVENTION

This invention relates to a high selectivity epoxysilicone-cross-linked polyimide membrane comprising a polyimide polymer with hydroxyl functional groups cross-linked with epoxy functional groups on epoxysilicone polymer under UV radiation and methods for making and using the membrane.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or an extraordinarily large membrane surface area is required to allow separation of large amounts of gases or liquids. Permeance, measured in Gas Permeation Units (GPU, 1 GPU=$10^{-6}$ cm$^3$ (STP)/cm$^2$ s (cm Hg)), is the pressure normalized flux and is equal to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide flat sheet membranes using phase inversion technique.

US 2005/0268783 A1 disclosed chemically cross-linked polyimide hollow fiber membranes prepared from a monoesterified polymer followed by final cross-linking after hollow fiber formation.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 8,016,124 disclosed a thin film composite membrane (TFC) comprising a blend of polyethersulfone and aromatic polyimide polymers. The TFC membrane has a layer of a blend of polyethersulfone and aromatic polyimide with a thickness from about 0.1 to about 3 microns.

U.S. Pat. No. 8,337,598 disclosed a TFC hollow fiber membrane with a core player and a sheath UV-crosslinked polyimide polymer layer.

Integrally-skinned asymmetric membranes have a selective thin layer and a porous layer from the same membrane material and formed from the same membrane solution at about the same time.

The present invention discloses a high selectivity epoxy-silicone-cross-linked polyimide membrane comprising a polyimide polymer with hydroxyl functional groups cross-linked with epoxy functional groups on epoxysilicone polymer under UV radiation, methods for making the membrane, and the use of the membrane for natural gas upgrading and $H_2$ purification.

SUMMARY OF THE INVENTION

This invention pertains to a high selectivity epoxysilicone-cross-linked polyimide membrane comprising a polyimide polymer with hydroxyl functional groups cross-linked with epoxy functional groups on epoxysilicone polymer under UV radiation, methods for making the membrane, and the use of the membrane for natural gas upgrading and $H_2$ purification. This invention pertains to a thin film composite membrane or an asymmetric integrally skinned membrane comprising a high selectivity epoxysilicone-cross-linked polyimide selective skin layer with hydroxyl functional groups on the polyimide polymer chain cross-linked with epoxy functional groups on epoxysilicone polymer chain under UV radiation. The high selectivity epoxysilicone-cross-linked polyimide membrane can have either flat sheet or hollow fiber geometry.

The present invention provides a high selectivity epoxysilicone-cross-linked polyimide membrane. The cross-linking between the polyimide polymer comprising hydroxyl functional groups and the epoxysilicone polymer comprising epoxy functional groups in the present invention provides the epoxysilicone-cross-linked polyimide membrane not only high selectivity, but also high plasticization and chemical resistance due to the formation of cross-linked polymer chain segments through possible direct covalent bonds.

The present invention provides a high selectivity epoxysilicone-cross-linked polyimide membrane comprising an epoxysilicone-cross-linked polyimide wherein the polyimide polymer with hydroxyl functional groups cross-linked with epoxy functional groups on epoxysilicone polymer. The epoxysilicone-cross-linked polyimide polymer comprises a plurality of repeating units of formula (I), wherein formula (I) is

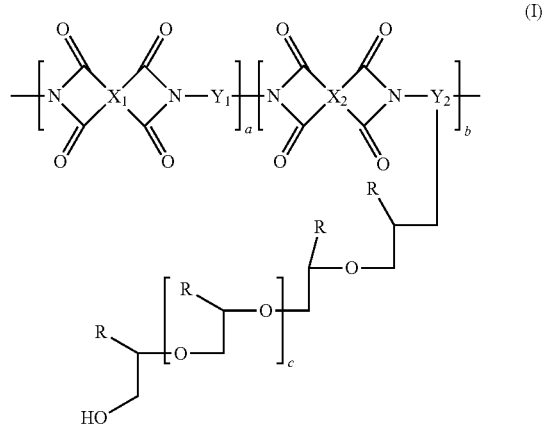

wherein R is selected from the group consisting of
$MD_xD^E_yQ_zT_uD^{Rf}_jD^A_kD^P_l(D'(CH(R')CH_2O)_m)_nD^B_pM$,
$M^ED_xD^E_yQ_zT_uD^{Rf}_jD^A_kD^P_l(D'(CH(R')CH_2O)_m)_nD^B_pM^E$,
$M^ED_xD^E_yQ_zT_uD^{Rf}_jD^A_kD^P_l(D'(CH(R')CH_2O)_m)_nD^B_pM$,
and mixtures thereof; wherein
$M=(CH_3)_3SiO_{1/2}$,
$M^E=$

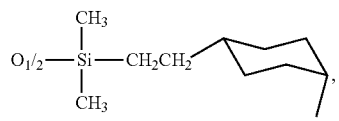

$D=(CH_3)_2SiO_{2/2}$,
$D'=(CH_3)_3SiO_{2/2}$, $D^E=$

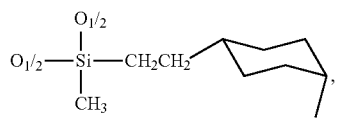

$D^{Rf}=(CF_3CH_2CH_2)(CH_3)SiO_{2/2}$,
$D^A=((HO)(C_2H_3)C_6H_9(CH_2)_2(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$,
wherein R' is selected from the group consisting of hydrogen, methyl, and ethyl, and wherein j, k, l, m, n, p, x, y, z, and u are positive integers and j, k, l, n, p, u, and z may be zero;

wherein $X_1$ and $X_2$ are selected from the group consisting of

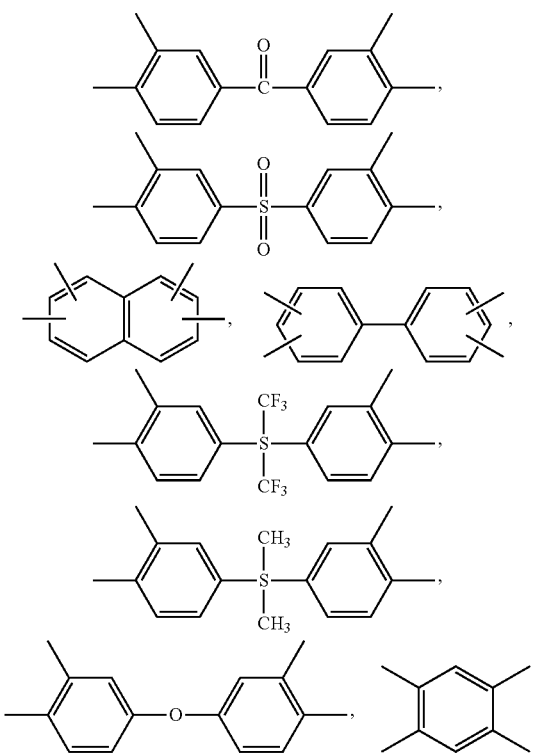

and mixtures thereof, respectively; $X_1$ and $X_2$ are the same or different from each other;

wherein $Y_1$ is selected from the group consisting of

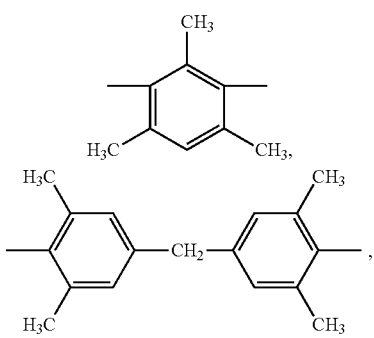

-continued

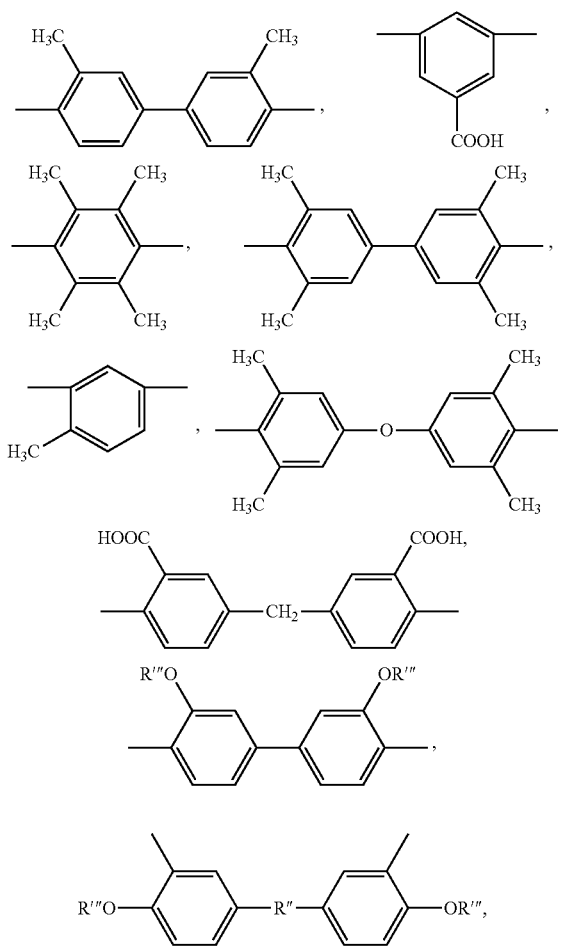

and mixtures thereof, R″ is selected from the group consisting of

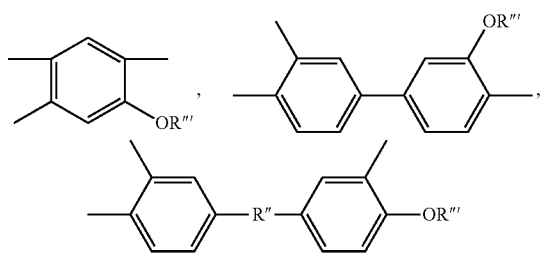

and mixtures thereof, R‴ is selected from the group consisting of —H, COCH₃, and mixtures thereof; Y₂ is selected from the group consisting of

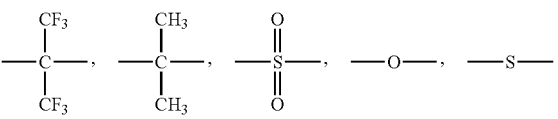

and mixtures thereof, and R‴ is selected from the group consisting of —H, COCH₃, and mixtures thereof; wherein a, b, and c are independent integers from 1 to 500. Within formula (I), preferably $X_1$ and $X_2$ are selected from the group consisting of

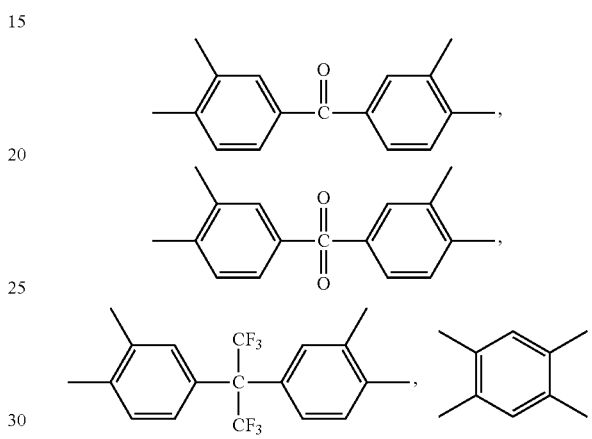

and mixtures thereof, respectively; $X_1$ and $X_2$ are the same or different from each other; preferably $Y_1$ is selected from the group consisting of

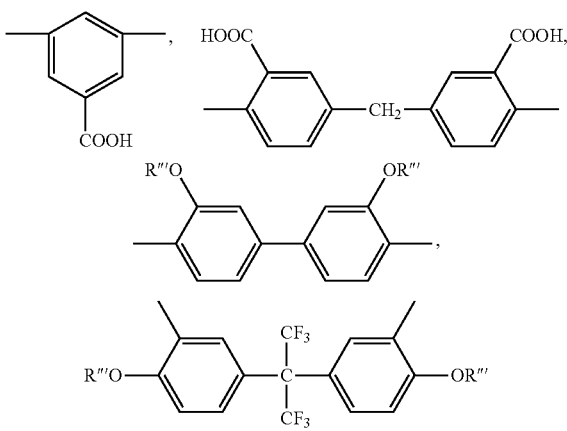

and mixtures thereof, wherein R‴ is selected from the group consisting of —H, COCH₃, and mixtures thereof; preferably $Y_2$ is

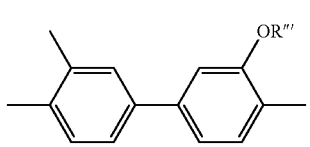

preferably R is selected from the group consisting of $MD_xD^E_yM$, $M^ED_xD^E_yM^E$, $M^ED_xD^E_yM$, and mixtures thereof; wherein
$M=(CH_3)_3SiO_{1/2}$,
$M^E=$

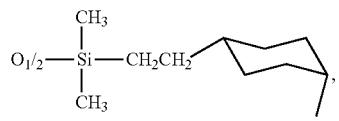

$D=(CH_3)_2SiO_{2/2}$,
$D^E=$

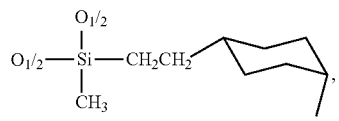

wherein x and y are positive integers. Within formula (I), more preferably $X_1$ is

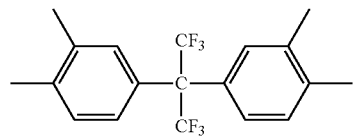

more preferably $X_2$ is

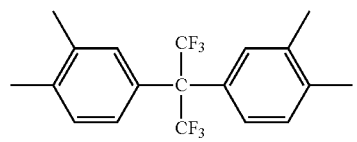

more preferably $Y_1$ is selected from the group consisting of

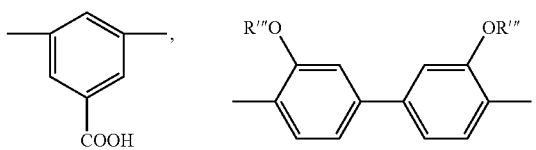

and mixtures thereof, wherein R''' is selected from the group consisting of —H, COCH$_3$, and mixtures thereof.

The high selectivity epoxysilicone-cross-linked polyimide membrane in the present invention can be either asymmetric integrally skinned membrane or thin film composite (TFC) membrane.

The asymmetric integrally-skinned flat sheet or hollow fiber high selectivity epoxysilicone-cross-linked polyimide membrane in the present invention was prepared by a phase inversion process.

The membrane dope formulation for the preparation of the asymmetric integrally-skinned flat sheet or hollow fiber high selectivity epoxysilicone-cross-linked polyimide membrane in the present invention comprises good solvents for the polyimide polymer with hydroxyl functional groups in the present invention that can completely dissolve the polymer. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, acetone, mixtures thereof, others known to those skilled in the art and mixtures thereof. In some cases, the membrane dope formulation for the preparation of asymmetric integrally-skinned flat sheet or hollow fiber high selectivity epoxysilicone-cross-linked polyimide membrane in the present invention also comprises poor solvents that cannot dissolve the polyimide polymer with hydroxyl functional groups such as methanol, ethanol, tetrahydrofuran (THF), toluene, n-octane, n-decane, lactic acid, citric acid, and mixtures thereof. It is believed that the proper weight ratio of the solvents used in the present invention provides asymmetric integrally-skinned flat sheet or hollow fiber high selectivity epoxysilicone-cross-linked polyimide membrane with less than 200 nm super thin nonporous selective skin layer which results in high permeances.

The thin film composite high selectivity epoxysilicone-cross-linked polyimide membrane described in the current invention comprises a thin nonporous selective separation layer comprising epoxysilicone-cross-linked polyimide described in the present invention and a porous nonselective mechanical support layer made from a material different from the epoxysilicone-cross-linked polyimide described in the present invention. The porous nonselective mechanical support layer made from a material different from the polyimide polymer with hydroxyl functional groups described in the present invention with a low selectivity and high flux can be made from materials including cellulose acetate, cellulose triacetate, polysulfone, polyethersulfone, polyamide, polyimide, polyetherimide, polyurethane, polycarbonate, polystyrene, polybenzoxazole, or mixtures thereof.

One epoxysilicone-cross-linked polyimide thin film composite hollow fiber membrane comprising an epoxysilicone-cross-linked polyimide described in the present invention is fabricated via a co-extrusion phase inversion spinning process from a sheath dope and a core dope using a triple-orifice spinneret. The core dope comprises an inexpensive, commercially available polyethersulfone (PES) polymer and an inexpensive commercially available P84 polyimide. The sheath dope comprises a poly(2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl) (abbreviated as PI-A). The PI-A polyimide was synthesized from a condensation reaction of 2,2'-bis-(3,4-dicarboxyphenyl)hexafluoropropane dianhydride (6FDA) with 3,3'-dihydroxy-4,4'-diamino-biphenyl (HAB) in DMAc or NMP polar solvent by a two-step process involving the formation of the poly(amic acid) followed by a solution imidization process. Acetic anhydride was used as the dehydrating agent and pyridine was used as the imidization catalyst for the solution imidization reaction during the second step synthesis. The core dope and sheath dope were co-extruded through a triple-orifice spinneret at a certain spinning temperature. A bore fluid containing 20% by weight of water in NMP was injected to the bore of the fiber simultaneously with the co-extruding of the core dope and sheath dope. The ratio of the core dope flow rate and the sheath dope flow rate was controlled to be in a range of 3:1 to 10:1. The dried thin film composite hollow fiber membrane was further cross-linked with an UV curable epoxysilicone SilForce* UV9315 purchased from Momentive, Columbus, Ohio, in the presence of a bis(dodecylphenyl)iodonium salt photocatalyst SilForce UV9380C ("SilForce" is a trademark of Momentive Performance Materials, Inc.) purchased from Momentive to form the high selectivity epoxysilicone-cross-linked polyimide thin film composite hollow fiber membrane PI-A-ESi/P84-PES.

The PI-A-ESi/P84-PES epoxysilicone-cross-linked polyimide thin film composite hollow fiber membrane showed high $CO_2/CH_4$ separation performance with $CO_2$ permeance of 69 GPU and $CO_2/CH_4$ selectivity of 30.6 for $CO_2/CH_4$ separation at 50° C. under 5617 kPa feed pressure with 10% $CO_2$ and 90% $CH_4$ in the feed gas.

The invention provides a process for separating at least one gas from a mixture of gases using the high selectivity epoxysilicone-cross-linked polyimide membrane comprising an epoxysilicone-cross-linked polyimide described herein, the process comprising: (a) providing a high selectivity epoxysilicone-cross-linked polyimide membrane described in the present invention which is permeable to said at least one gas; (b) contacting the mixture on one side of the high selectivity epoxysilicone-cross-linked polyimide membrane to cause said at least one gas to permeate the membrane; and (c) removing from the opposite side of the membrane a permeate gas composition comprising a portion of said at least one gas which permeated said membrane.

The high selectivity epoxysilicone-cross-linked polyimide membranes described in the current invention are not only suitable for $CO_2/CH_4$ separation, but also suitable for a variety of other gas separations such as $H_2$ purification, $O_2/N_2$ and $H_2S/CH_4$ separations.

DETAILED DESCRIPTION OF THE INVENTION

Commercially available gas separation membranes, such as CA, polyimide, and polysulfone membranes formed by phase inversion and solvent exchange methods and with either hollow fiber or flat sheet geometry have an asymmetric integrally skinned membrane structure. Such membranes are characterized by a thin, dense, selectively semipermeable surface skin layer and a less dense void-containing (or porous), non-selective support layer, with pore sizes ranging from large in the support region to very small proximate to the skin. The skin layer and the porous non-selective support layer are formed from the same membrane material and formed from the same membrane solution at about the same time.

Another type of asymmetric gas separation membrane is thin-film composite (TFC) membrane. TFC membranes are also characterized by a thin, selectively semipermeable surface skin layer and a porous non-selective support layer. However, the selective thin layer and the non-selective porous layer can be made from different materials. In addition, the selective thin layer and the non-selective porous layer can be formed from two separate steps or from a co-extrusion process of two different membrane solutions.

For the TFC flat sheet membrane formed from dip-coating or laminating process, the selective thin dense layer on the non-selective porous layer can be delaminated easily from the non-selective porous layer, which will result in significantly decreased selectivity for gas separations. On the other hand, for the TFC hollow fiber membrane formed from a co-extrusion phase inversion process, the sheath layer with a selective thin dense layer and relatively porous thin sublayer and the core non-selective porous layer are formed from a one-step phase inversion process. Therefore, the sheath layer cannot be delaminated easily from the non-selective core layer. In addition, the core non-selective porous layer of the TFC hollow fiber membrane can be made from low cost membrane materials and the thin selective sheath layer can be made from high cost high performance new membrane material.

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases: such as nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including nitrogen enrichment from air, hydrogen from nitrogen, argon or methane, carbon dioxide removal from natural gas and biogas and in enhanced oil recovery.

The present invention provides a high selectivity epoxysilicone-cross-linked polyimide membrane comprising a polyimide polymer with hydroxyl functional groups cross-linked with epoxy functional groups on epoxysilicone polymer in the presence of an effective amount of a bis(dodecylphenyl)iodonium salt photocatalyst under UV radiation. This invention also pertains to the application of the high selectivity epoxysilicone-cross-linked polyimide membrane for $H_2$ purifications such as $H_2/CH_4$ separation, and also for a variety of other gas separations such as separations of $CO_2/CH_4$, $H_2S/CH_4$, $CO_2/N_2$, olefin/paraffin (e.g. propylene/propane), and $O_2/N_2$ separations.

This invention pertains to a thin film composite membrane or an asymmetric integrally skinned membrane comprising a high selectivity epoxysilicone-cross-linked polyimide selective skin layer with hydroxyl functional groups on the polyimide polymer chain cross-linked with epoxy functional groups on epoxysilicone polymer chain in the presence of the bis(dodecylphenyl)iodonium salt photocatalyst under UV radiation. The high selectivity epoxysilicone-cross-linked polyimide membrane can have either flat sheet or hollow fiber geometry.

The present invention provides a high selectivity epoxysilicone-cross-linked polyimide membrane. The cross-linking between the polyimide polymer comprising hydroxyl functional groups and the epoxysilicone polymer comprising epoxy functional groups in the present invention provides the epoxysilicone-cross-linked polyimide membrane not only high selectivity, but also high plasticization and chemical resistance due to the formation of cross-linked polymer chain segments through possible direct covalent bonds.

The present invention provides a high selectivity epoxy-silicone-cross-linked polyimide membrane comprising an epoxysilicone-cross-linked polyimide wherein the polyimide polymer with hydroxyl functional groups cross-linked with epoxy functional groups on epoxysilicone polymer. The epoxysilicone-cross-linked polyimide polymer comprises a plurality of repeating units of formula (I), wherein formula (I) is

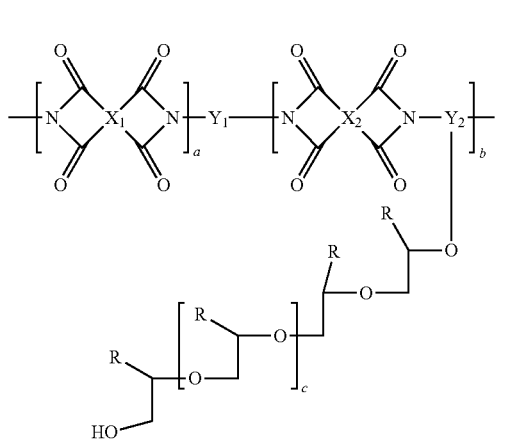

wherein R is selected from the group consisting of
$MD_xD^E_yQ_zT_uD^{Rf}_jD^A_kD^P_l(D'(CH(R')CH_2O)_m)_nD^B_pM$,
$M^ED_xD^E_yQ_zT_uD^{Rf}_jD^A_kD^P_l(D'(CH(R')CH_2O)_m)_nD^B_pM^E$,
$M^ED_xD^E_yQ_zT_uD^{Rf}_jD^A_kD^P_l(D'(CH(R')CH_2O)_m)_nD^B_pM$,
and mixtures thereof; wherein
$M=(CH_3)_3SiO_{1/2}$,
$M^E=$

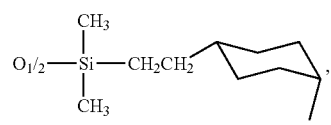

$D=(CH_3)_2SiO_{2/2}$,
$D'=(CH_3)_3SiO_{2/2}$,
$D^E=$

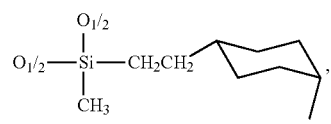

$D^{Rf}=(CF_3CH_2CH_2)(CH_3)SiO_{2/2}$,
$D^A=((HO)(C_2H_3)C_6H_9(CH_2)_2(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$,
wherein R' is selected from the group consisting of hydrogen, methyl, and ethyl, and wherein j, k, l, m, n, p, x, y, z, and u are positive integers and j, k, l, n, p, u, and z may be zero;

wherein $X_1$ and $X_2$ are selected from the group consisting of

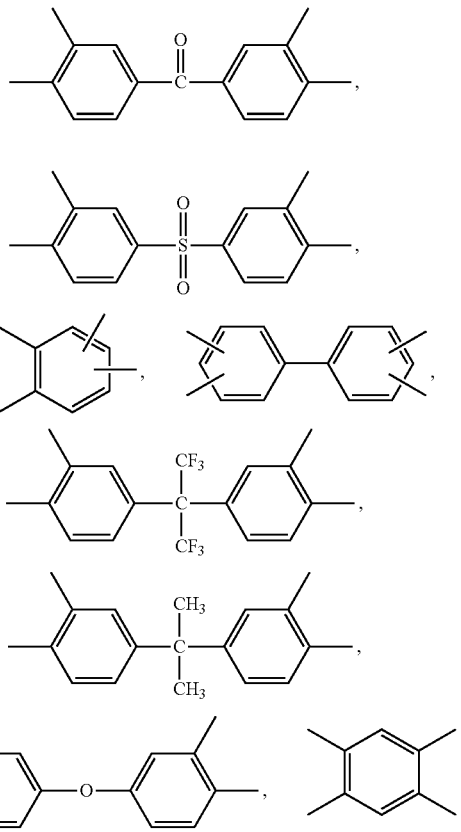

and mixtures thereof, respectively; $X_1$ and $X_2$ are the same or different from each other;

wherein $Y_1$ is selected from the group consisting of

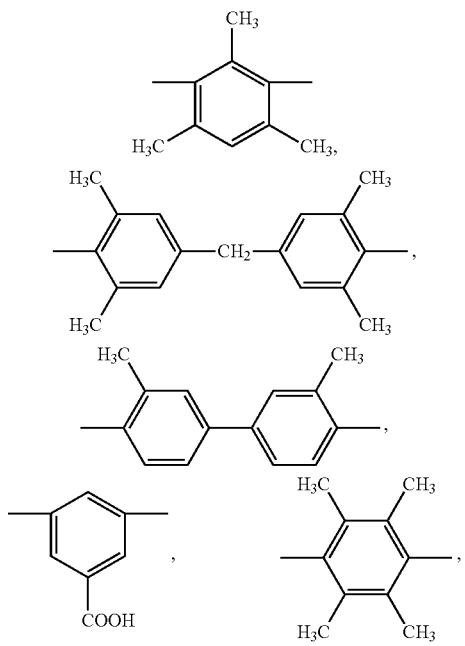

-continued

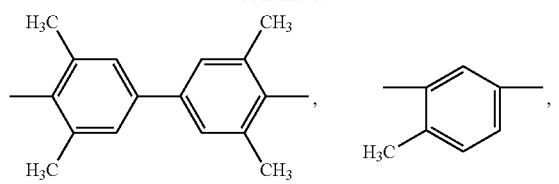

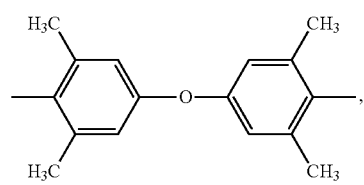

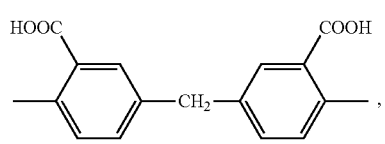

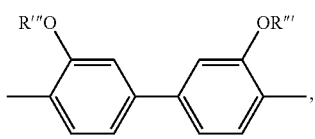

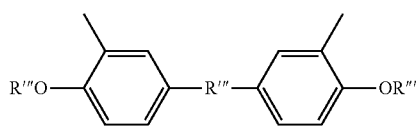

and mixtures thereof, R" is selected from the group consisting of

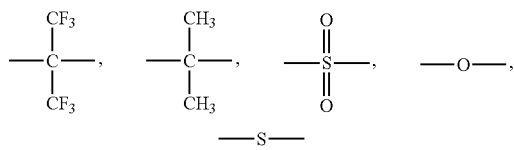

and mixtures thereof, and R'" is selected from the group consisting of —H, COCH₃, and mixtures thereof; Y₂ is selected from the group consisting of

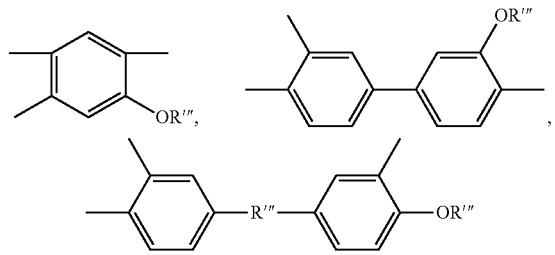

and mixtures thereof, R" is selected from the group consisting of

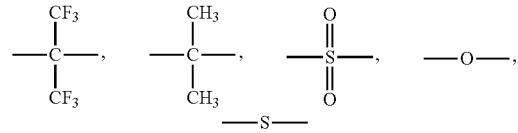

and mixtures thereof, and R'" is selected from the group consisting of —H, COCH₃, and mixtures thereof; wherein a, b, and c are independent integers from 1 to 500. Within formula (I), preferably X₁ and X₂ are selected from the group consisting of

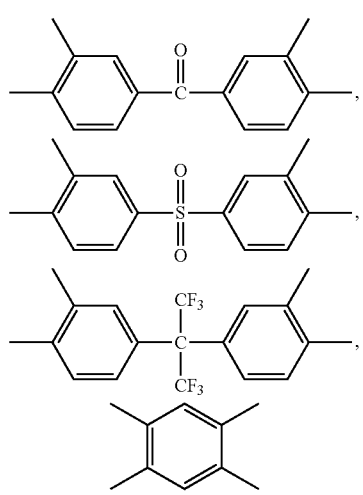

and mixtures thereof, respectively; X₁ and X₂ are the same or different from each other; preferably Y₁ is selected from the group consisting of

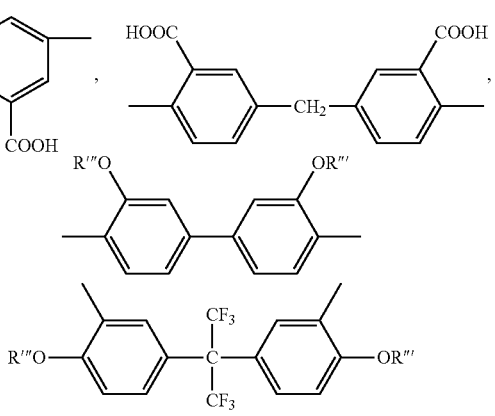

and mixtures thereof, wherein R'" is selected from the group consisting of —H, COCH₃, and mixtures thereof; preferably Y₂ is

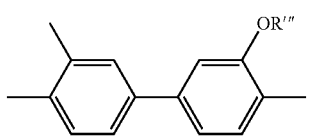

preferably R is selected from the group consisting of $MD_x^ED_y^EM$, $M^ED_xD_y^EM^E$, $M^ED_xD_y^EM$, and mixtures thereof; wherein
$M=(CH_3)_3SiO_{1/2}$,
$M^E=$

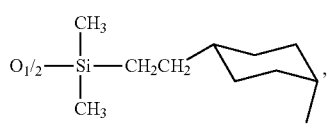

$D=(CH_3)_2SiO_{2/2}$,
$D^E=$

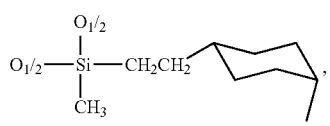

wherein x and y are positive integers. Within formula (I), more preferably $X_1$ is

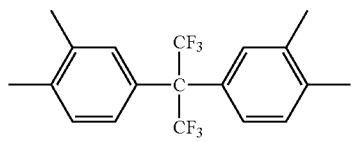

more preferably $X_2$ is

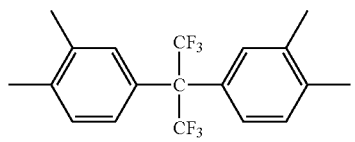

more preferably $Y_1$ is selected from the group consisting of

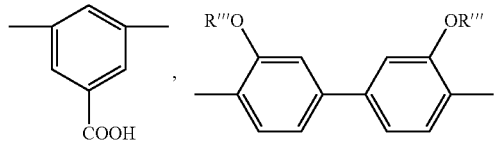

and mixtures thereof, wherein R''' is selected from the group consisting of —H, COCH$_3$, and mixtures thereof.

The polyimide polymer with hydroxyl functional groups used for the preparation of the high selectivity epoxysilicone-cross-linked polyimide membrane in the present invention comprises a plurality of repeating units of formula (II), wherein formula (II) is

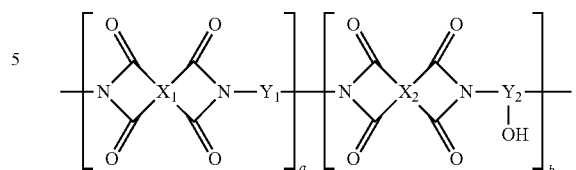

wherein $X_1$ and $X_2$ are selected from the group consisting of

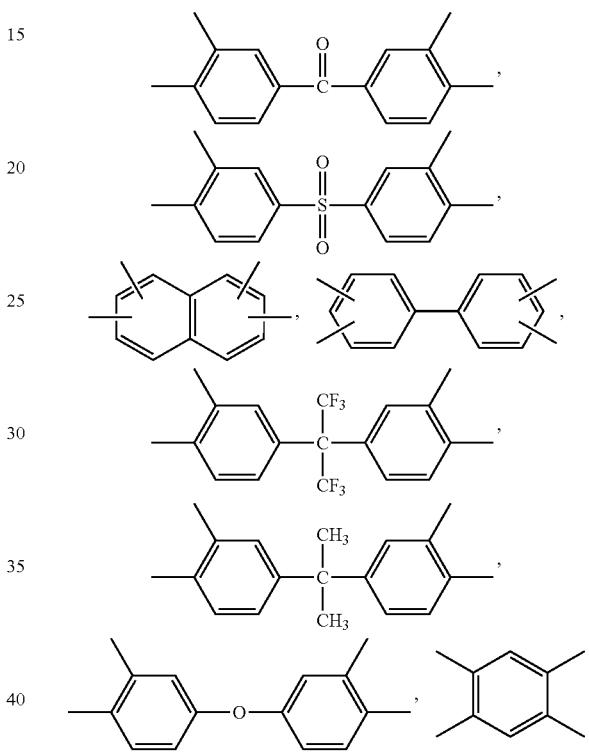

and mixtures thereof, respectively; $X_1$ and $X_2$ are the same or different from each other;
wherein $Y_1$ is selected from the group consisting of

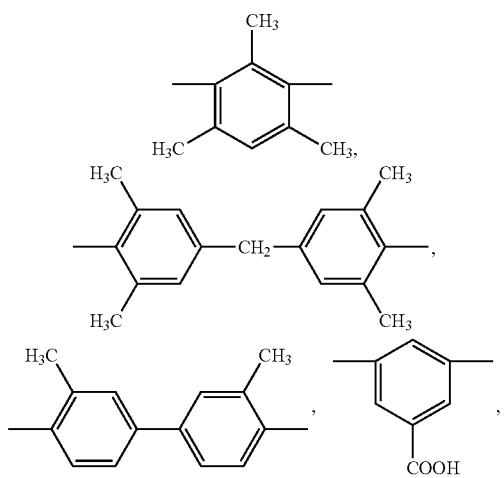

-continued

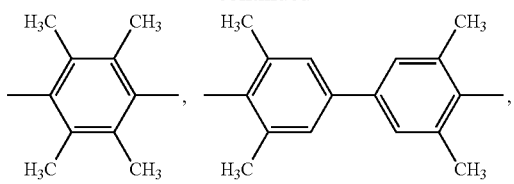

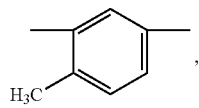

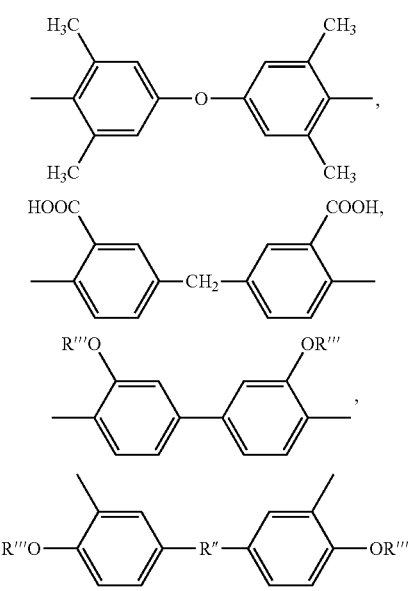

and mixtures thereof, R″ is selected from the group consisting of

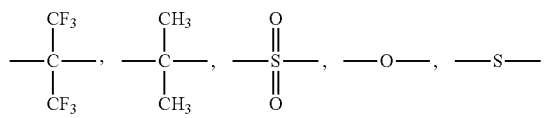

and mixtures thereof, and R‴ is selected from the group consisting of —H, COCH$_3$, and mixtures thereof; Y$_2$—OH is selected from the group consisting of

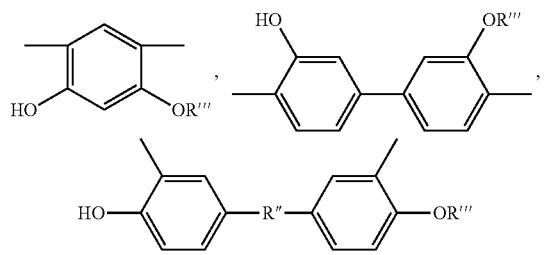

and mixtures thereof, R″ is selected from the group consisting of

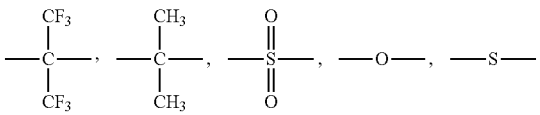

and mixtures thereof, and R‴ is selected from the group consisting of —H, COCH$_3$, and mixtures thereof; wherein a and b are independent integers from 1 to 500. Within formula (II), preferably X$_1$ and X$_2$ are selected from the group consisting of

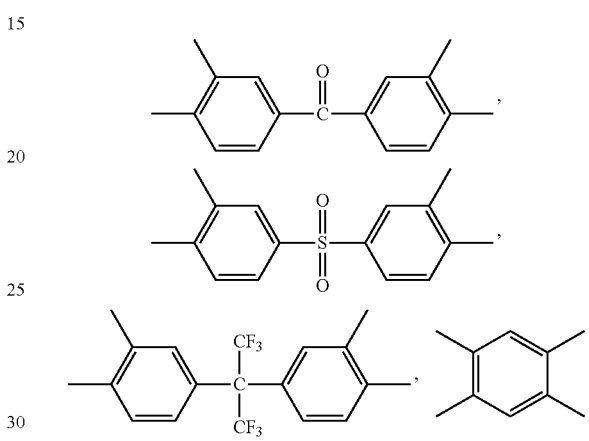

and mixtures thereof, respectively; X$_1$ and X$_2$ are the same or different from each other; preferably Y$_1$ is selected from the group consisting of

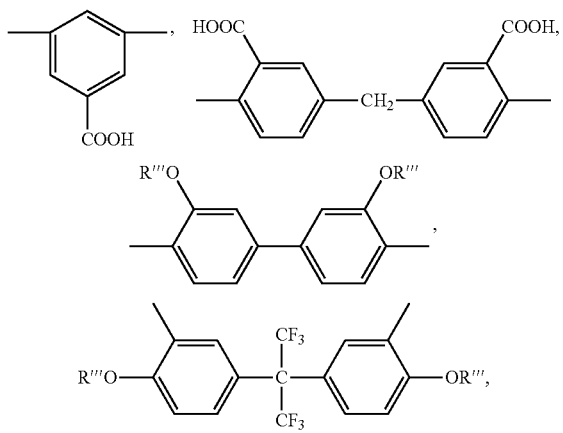

and mixtures thereof, wherein R‴ is selected from the group consisting of —H, COCH$_3$, and mixtures thereof; preferably Y$_2$—OH is

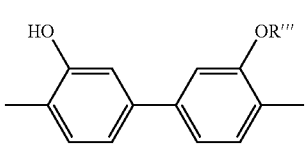

Within formula (II), more preferably $X_1$ is

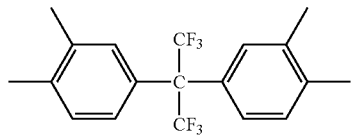

more preferably $X_2$ is

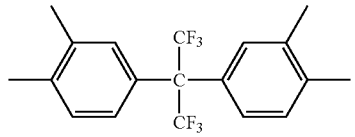

more preferably $Y_1$ is selected from the group consisting of

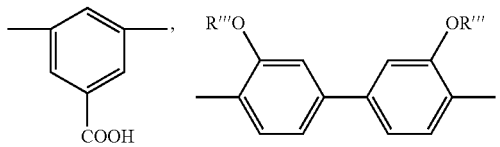

sand mixtures thereof, wherein R''' is selected from the group consisting of —H, COCH$_3$, and mixtures thereof.

The polyimide polymer with hydroxyl functional groups used for making the high selectivity epoxysilicone-cross-linked membrane described in the current invention is selected from poly(2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl) (abbreviated as PI-A), poly(2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl-3,5- diaminobenzoic acid) (abbreviated as PI-B), and a mixture thereof.

The polyimide polymer with hydroxyl functional groups used for making the high selectivity epoxysilicone-cross-linked membrane described in the current invention have a weight average molecular weight in the range of 50,000 to 1,000,000 Daltons, preferably between 70,000 to 500,000 Daltons.

The epoxysilicone polymer with epoxy functional groups used for the preparation of the high selectivity epoxysilicone-cross-linked polyimide membrane in the present invention is selected from the group consisting of
$MD_xD^E_yQ_zT_uD^{Rf}_jD^A_kD^P_l(D'(CH(R')CH_2O)_m)_nD^B_pM$,
$M^ED_xD^E_yQ_zT_uD^{Rf}_jD^A_kD^P_l(D'(CH(R')CH_2O)_m)_nD^B_pM^E$,
$M^ED_xD^E_yQ_zT_uD^{Rf}_jD^A_kD^P_l(D'(CH(R')CH_2O)_m)_nD^B_pM$, and mixtures thereof; wherein
$M=(CH_3)_3SiO_{1/2}$,
$M^E=$

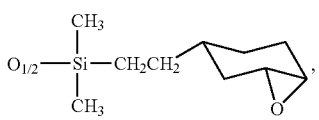

$D=(CH_3)_2SiO_{2/2}$,
$D'=(CH_3)_3SiO_{2/2}$, $D^E=$

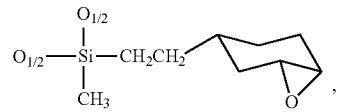

$D^{Rf}=(CF_3CH_2CH_2)(CH_3)SiO_{2/2}$,
$D^A=((HO)(C_2H_3)C_6H_9(CH_2)_2(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, wherein R' is selected from the group consisting of hydrogen, methyl, and ethyl, and wherein j, k, l, m, n, p, x, y, z, and u are positive integers and j, k, l, n, p, u, and z may be zero. Preferably the epoxysilicone polymer with epoxy functional groups used for the preparation of the high selectivity epoxysilicone-cross-linked polyimide membrane in the present invention is selected from the group consisting of $MD_xD^E_yM$, $M^ED_xD^E_yM^E$, $M^ED_xD^E_yM$, and mixtures thereof; wherein
$M=(CH_3)_3SiO_{1/2}$,
$M^E=$

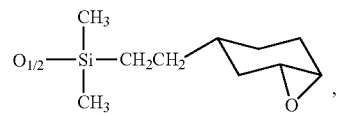

$D=(CH_3)_2SiO_{2/2}$,
$D^E=$

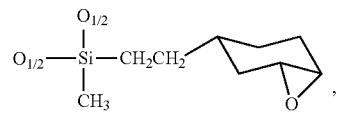

wherein x and y are positive integers.

Preferably, the epoxysilicone polymer with epoxy functional groups used for the preparation of the high selectivity epoxysilicone-cross-linked polyimide membrane in the present invention is selected from commercially available UV curable epoxysilicones, for example, Momentive SilForce* UV-photocurable epoxysilicones under the denominations of SilForce* UV9315, SilForce* UV9430, and SilForce* UV9400.

The bis(dodecylphenyl)iodonium salt photocatalyst used for the preparation of the high selectivity epoxysilicone-cross-linked polyimide membrane described in the present invention is selected from the salts of the group of acids consisting of hexafluoroantimonic acid, hexafluoroarsenic acid, hexafluorophosphoric acid, tetrafluoroboric acid, tetra (perfluorophenyl)boric acid and mixtures thereof. An example of the iodonium photo-catalyst is the commercially available one from Momentive under the denominations of SilForce* UV9380C. Preferably, the ratio of the bis(dodecylphenyl)iodonium salt photocatalyst and the epoxysilicone polymer used for the preparation of the high selectivity epoxysilicone-cross-linked polyimide membrane in the present invention is in a range from about 100:1 to 100:10 by weight.

The high selectivity epoxysilicone-cross-linked polyimide membrane in the present invention can be either asymmetric integrally skinned membrane or thin film composite (TFC) membrane.

The asymmetric integrally-skinned flat sheet or hollow fiber high selectivity epoxysilicone-cross-linked polyimide membrane in the present invention was prepared by a phase inversion process.

The membrane dope formulation for the preparation of the asymmetric integrally-skinned flat sheet or hollow fiber high selectivity epoxysilicone-cross-linked polyimide membrane in the present invention comprises good solvents for the polyimide polymer with hydroxyl functional groups in the present invention that can completely dissolve the polymer. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, acetone, mixtures thereof, others known to those skilled in the art and mixtures thereof. In some cases, the membrane dope formulation for the preparation of asymmetric integrally-skinned flat sheet or hollow fiber high selectivity epoxysilicone-cross-linked polyimide membrane in the present invention also comprises poor solvents that cannot dissolve the polyimide polymer with hydroxyl functional groups such as methanol, ethanol, tetrahydrofuran (THF), toluene, n-octane, n-decane, lactic acid, citric acid, and mixtures thereof. It is believed that the proper weight ratio of the solvents used in the present invention provides asymmetric integrally-skinned flat sheet or hollow fiber high selectivity epoxysilicone-cross-linked polyimide membrane with less than 200 nm super thin nonporous selective skin layer which results in high permeances.

The thin film composite high selectivity epoxysilicone-cross-linked polyimide membrane comprises a thin nonporous selective separation layer comprising epoxysilicone-cross-linked polyimide described in the present invention and a porous nonselective mechanical support layer made from a material different from the epoxysilicone-cross-linked polyimide described in the present invention. The thin film composite high selectivity epoxysilicone-cross-linked polyimide membrane has either hollow fiber or flat sheet geometry.

For the preparation of TFC hollow fiber high selectivity epoxysilicone-cross-linked polyimide membrane, it is preferred that the solution of the polyimide polymer with hydroxyl functional groups has a concentration of from about 20 to about 40 wt %. The solution of the polyimide polymer with hydroxyl functional groups and the polymer solution for the formation of the porous nonselective mechanical support layer were co-extruded from a spinneret to form TFC hollow fiber high selectivity epoxysilicone-cross-linked polyimide membrane.

The porous nonselective mechanical support layer was made from a material different from the polyimide polymer with hydroxyl functional groups described in the present invention with a low selectivity and high flux. Selection of the porous nonselective mechanical support layer for the preparation of TFC high selectivity epoxysilicone-cross-linked polyimide membrane in the present invention may be made on the basis of the heat resistance, solvent resistance, and mechanical strength of the porous nonselective mechanical support layer, as well as other factors dictated by the operating conditions for selective permeation. The porous nonselective mechanical support layer is preferably at least partially self-supporting, and in some instances may be essentially self-supporting. The porous nonselective mechanical support layer may provide essentially all of the structural support for the membrane. Some preferred polymers different from the polyimide polymer with hydroxyl functional groups described in the present invention that are suitable for the preparation of the porous nonselective mechanical support layer for the TFC high selectivity epoxysilicone-cross-linked polyimide membrane according to the present invention include, but are not limited to, polysulfones, sulfonated polysulfones, polyethersulfones (PESs), sulfonated PESs, polyethers, polyetherimides such as Ultem, cellulosic polymers such as cellulose acetate and cellulose triacetate, polyamides, polyimides such as P84 and P84HT, polyether ketones, and mixtures thereof.

The invention provides a process for separating at least one gas from a mixture of gases using high selectivity epoxysilicone-cross-linked polyimide membrane described in the present invention, the process comprising: (a) providing a high selectivity epoxysilicone-cross-linked polyimide membrane described in the present invention which is permeable to said at least one gas; (b) contacting the mixture on one side of the high selectivity epoxysilicone-cross-linked polyimide membrane described in the present invention to cause said at least one gas to permeate the membrane; and (c) removing from the opposite side of the membrane a permeate gas composition comprising a portion of said at least one gas which permeated said membrane.

The high selectivity epoxysilicone-cross-linked polyimide membrane described in the present invention is especially useful in the purification, separation or adsorption of a particular species in the liquid or gas phase.

The high selectivity epoxysilicone-cross-linked polyimide membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the high selectivity epoxysilicone-cross-linked polyimide membrane described in the present invention. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the high selectivity epoxysilicone-cross-linked polyimide membrane of the present invention will range from about −20° to about 100° C., and most preferably, the effective operating temperature of the membranes of the present invention will range from about 25° to about 100° C.

The high selectivity epoxysilicone-cross-linked polyimide membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinyl-chloride monomer, propylene) may be recovered. Further examples of gas/vapor separation processes in which the high selectivity epoxysilicone-cross-linked polyimide membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery.

The high selectivity epoxysilicone-cross-linked polyimide membrane described in the present invention also has immediate application to concentrate olefin in a paraffin/olefin stream for olefin cracking application. For example, the high selectivity epoxysilicone-cross-linked polyimide membrane can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the high selectivity epoxysilicone-cross-linked polyimide membrane is for separating isoparaffin and normal paraffin in light paraffin isomerization and MaxEne™, a process for enhancing the concentration of normal paraffin (n-paraffin) in the naphtha cracker feedstock, which can be then converted to ethylene.

The high selectivity epoxysilicone-cross-linked polyimide membrane can also be operated at high temperature to provide the sufficient dew point margin for natural gas upgrading (e.g, $CO_2$ removal from natural gas). The high selectivity epoxysilicone-cross-linked polyimide membrane described in the present invention can be used in either a single stage membrane or as the first or/and second stage membrane in a two stage membrane system for natural gas upgrading.

EXAMPLES

The following examples are provided to illustrate one or more preferred embodiments of the invention, but are not limited embodiments thereof. Numerous variations can be made to the following examples that lie within the scope of the invention.

Example 1

Preparation of PI-A-ESi/P84-PES Epoxysilicone-cross-linked Polyimide TFC Hollow Fiber Membrane The PI-A-ESi/P84-PES epoxysilicone-cross-linked polyimide thin film composite (TFC) hollow fiber membrane comprising an epoxysilicone-cross-linked poly(2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl) (abbreviated as PI-A) polyimide is fabricated via a co-extrusion phase inversion spinning process from a sheath dope and a core dope using a triple-orifice spinneret. The core dope comprises polyethersulfone (PES) polymer, P84 polyimide, NMP, $LiNO_3$ and lactic acid was prepared. The sheath dope comprises PI-A, NMP, 1,3-dioxolane, isopropanol, and acetone was also prepared. The core dope and sheath dope were co-extruded through a triple-orifice spinneret at 50° C. A bore fluid containing 20% by weight of water in NMP was injected to the bore of the fiber simultaneously with the co-extruding of the core dope and sheath dope. The ratio of the core dope flow rate, the sheath dope flow rate, and the bore fluid flow rate was 10:1:2.7. The nascent fiber traveled through an air gap length of 13 cm at room temperature, and then was immersed into a water coagulant bath at 0° C. and wound up at a rate of 23 m/min. The water-wet fiber was annealed in a hot water bath at 85° C. for 30 minutes. The annealed water-wet fiber was then sequentially exchanged with methanol and hexane for three times and for 30 minutes each time, followed by drying at 85° C. in an oven for 1 hour to form dried TFC hollow fiber membrane. The PI-A polyimide on the sheath layer was further cross-linked with an UV curable epoxysilicone Sil-Force* UV9315 purchased from Momentive in the presence of a bis(dodecylphenyl)iodonium salt photocatalyst Sil-Force* UV9380C purchased from Momentive under UV radiation for 3 min to form the high selectivity epoxysilicone-cross-linked polyimide thin film composite hollow fiber membrane PI-A-ESi/P84-PES.

Comparative Example 1

Preparation of PI-A/P84-PES Polyimide TFC Hollow Fiber Membrane

The PI-A/P84-PES polyimide TFC hollow fiber membrane comprising un-cross-linked PI-A polyimide is fabricated via a co-extrusion phase inversion spinning process from a sheath dope and a core dope using a triple-orifice spinneret. The core dope comprises PES polymer, P84 polyimide, NMP, $LiNO_3$ and lactic acid was prepared. The sheath dope comprises PI-A, NMP, 1,3-dioxolane, isopropanol, and acetone was also prepared. The core dope and sheath dope were co-extruded through a triple-orifice spinneret at 50° C. A bore fluid containing 20% by weight of water in NMP was injected to the bore of the fiber simultaneously with the co-extruding of the core dope and sheath dope. The ratio of the core dope flow rate, the sheath dope flow rate, and the bore fluid flow rate was 10:1:2.7. The nascent fiber traveled through an air gap length of 13 cm at room temperature, and then was immersed into a water coagulant bath at 0° C. and wound up at a rate of 23 m/min.

The water-wet fiber was annealed in a hot water bath at 85° C. for 30 minutes. The annealed water-wet fiber was then sequentially exchanged with methanol and hexane for three times and for 30 minutes each time, followed by drying at 85° C. in an oven for 1 hour to form dried TFC hollow fiber membrane. The membrane was further coated with a thin layer of thermally curable RTV silicone rubber and cured at 85° C. in an oven for 1 hour to form the final PI-A/P84-PES TFC hollow fiber membrane.

Example 3

Evaluation of $CO_2/CH_4$ Separation Performance of PI-A-ESi/P84-PES and PI-A/P84-PES TFC Hollow Fiber Membranes The PI-A-ESi/P84-PES epoxysilicone-cross-linked polyimide TFC hollow fiber membrane and PI-A/P84-PES un-cross-linked polyimide TFC hollow fiber membrane were tested for $CO_2/CH_4$ separation at 50° C. under 5617 kPa (800 psig) feed gas pressure with 10% of $CO_2$ and 90% of $CH_4$ in the feed. The results are shown in Table 1. The PI-A-ESi/P84-PES epoxysilicone-cross-linked polyimide TFC hollow fiber membrane showed high $CO_2/CH_4$ separation performance with $CO_2$ permeance of 69 GPU and $CO_2/CH_4$ selectivity of 30.6 for $CO_2/CH_4$ separation at 50° C. under 5617 kPa feed pressure with 10% $CO_2$ and 90% $CH_4$ in the feed gas. The PI-A/P84-PES un-cross-linked polyimide TFC hollow fiber membrane showed higher $CO_2$ permeance (123 GPU) and significantly lower $CO_2/CH_4$ selectivity (11.8) than the PI-A-ESi/P84-PES epoxysilicone-cross-linked polyimide TFC hollow fiber membrane even though the PI-A/P84-PES un-cross-linked polyimide TFC hollow fiber membrane has been coated with a thin layer of thermally cured RTV silicone.

TABLE 1

$CO_2/CH_4$ separation performance of PI-A-ESi/P84-PES epoxysilicone-cross-linked polyimide TFC hollow fiber membrane and PI-A/P84-PES un-cross-linked polyimide TFC hollow fiber membrane

| Membrane | $CO_2$ permeance (GPU) | $CO_2/CH_4$ selectivity |
|---|---|---|
| PI-A-ESi/P84-PES | 69 | 30.6 |
| PI-A/P84-PES | 123 | 11.8 |

1 GPU=$10^{-6}$ cm$^3$ (STP)/cm$^2$ s (cm Hg)
Testing conditions: 50° C., 5617 kPa (800 psig) feed gas pressure,
10% $CO_2$ and 90% of $CH_4$ in the feed.

Example 4

Preparation of PI-B-ESi/P84-PES Epoxysilicone-cross-linked Polyimide TFC Hollow Fiber Membrane The PI-B-ESi/P84-PES epoxysilicone-cross-linked polyimide TFC hollow fiber membrane comprising an epoxysilicone-cross-linked poly(2,2'-bis-(3,4-dicarboxyphenyl) hexafluoropropane dianhydride-3,3'-dihydroxy-4,4'-diamino-biphenyl-3,3'-diacetoxy-4,4'-diamino-biphenyl-3, 5-diaminobenzoic acid) (abbreviated as PI-B) is fabricated via a co-extrusion phase inversion spinning process from a sheath dope and a core dope using a triple-orifice spinneret using a procedure similar to that for PI-A-ESi/P84-PES TFC hollow fiber membrane as described in Example 1, but PI-B polymer instead of PI-A is used for the sheath layer.

Comparative Example 4

Preparation of PI-B/P84-PES Polyimide TFC Hollow Fiber Membrane

The PI-B/P84-PES TFC hollow fiber membrane comprising un-cross-linked PI-A polyimide is fabricated via a co-extrusion phase inversion spinning process from a sheath dope and a core dope using a triple-orifice spinneret using a procedure similar to that for PI-A/P84-PES TFC hollow fiber membrane as described in Comparable Example 1, but PI-B polymer instead of PI-A is used for the sheath layer.

Example 5

Evaluation of $CO_2/CH_4$ Separation Performance of PI-B-ESi/P84-PES and PI-B/P84-PES TFC Hollow Fiber Membranes The PI-B-ESi/P84-PES epoxysilicone-cross-linked polyimide TFC hollow fiber membrane and PI-B/P84-PES un-cross-linked polyimide TFC hollow fiber membrane were tested for $CO_2/CH_4$ separation at 50° C. under 5617 kPa (800 psig) feed gas pressure with 10% of $CO_2$ and 90% of $CH_4$ in the feed. The results are shown in Table 2. The PI-B-ESi/P84-PES epoxysilicone-cross-linked polyimide TFC hollow fiber membrane showed high $CO_2/CH_4$ separation performance with $CO_2$ permeance of 51 GPU and $CO_2/CH_4$ selectivity of 26.2 for $CO_2/CH_4$ separation at 50° C. under 5617 kPa feed pressure with 10% $CO_2$ and 90% $CH_4$ in the feed gas. The PI-B/P84-PES un-cross-linked polyimide TFC hollow fiber membrane showed higher $CO_2$ permeance (69 GPU) and significantly lower $CO_2/CH_4$ selectivity (12.2) than the PI-B-ESi/P84-PES epoxysilicone-cross-linked polyimide TFC hollow fiber membrane even though the PI-B/P84-PES un-cross-linked polyimide TFC hollow fiber membrane has been coated with a thin layer of thermally cured RTV silicone.

TABLE 2

$CO_2/CH_4$ separation performance of PI-B-ESi/P84-PES epoxysilicone cross-linked polyimide TFC hollow fiber membrane and PI-B/P84-PES un-cross-linked polyimide TFC hollow fiber membrane

| Membrane | $CO_2$ permeance (GPU) | $CO_2/CH_4$ selectivity |
|---|---|---|
| PI-B-ESi/P84-PES | 51 | 26.2 |
| PI-B/P84-PES | 69 | 12.2 |

1 GPU=$10^{-6}$ cm$^3$ (STP)/cm$^2$ s (cm Hg)
Testing conditions: 50° C., 5617 kPa (800 psig) feed gas pressure, 10% $CO_2$ and 90% of $CH_4$ in the feed.

The invention claimed is:
1. An epoxysilicone-cross-linked polyimide membrane comprising an epoxysilicone-cross-linked polyimide polymer wherein said epoxysilicone-cross-linked polyimide polymer comprises a plurality of repeating units of formula (I), wherein formula (I) is

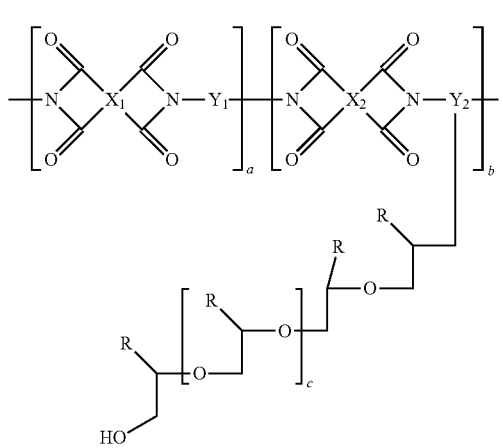

(I)

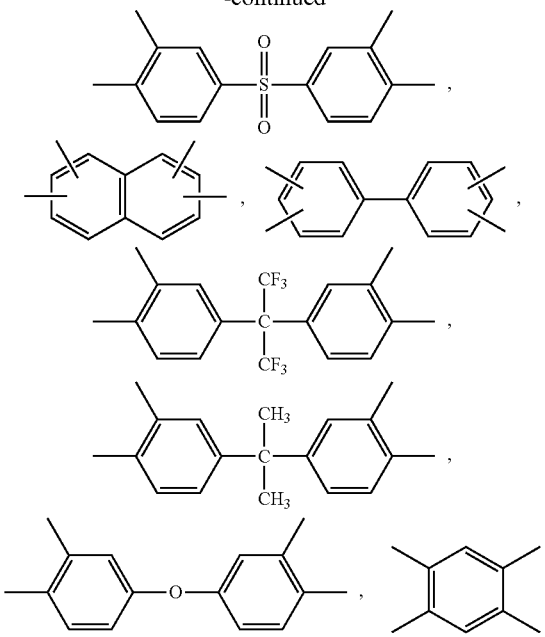

and mixtures thereof, respectively; $X_1$ and $X_2$ are the same or different from each other; wherein $Y_1$ is selected from the group consisting of wherein R is selected from the group consisting of
$MD_xD^E{}_yQ_zT_uD^{Rf}{}_jD^A{}_kD^P{}_l(D'(CH(R')CH_2O)_m)_nD^B{}_pM$,
$M^ED_xD^E{}_yQ_zT_uD^{Rf}{}_jD^A{}_kD^P{}_l(D'(CH(R')CH_2O)_m)_nD^B{}_pM^E$,
$M^ED_xD^E{}_yQ_zT_uD^{Rf}{}_jD^A{}_kD^P{}_l(D'(CH(R')CH_2O)_m)_nD^B{}_pM$,
and mixtures thereof; wherein
$M=(CH_3)_3SiO_{1/2}$,
$M^E=$

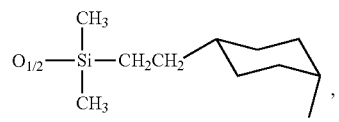

$D=(CH_3)_2SiO_{2/2}$,
$D'=(CH_3)_3SiO_{2/2}$,
$D^E=$

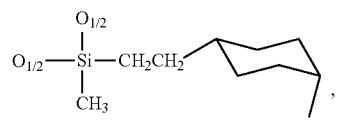

$D^{Rf}=(CF_3CH_2CH_2)(CH_3)SiO_{2/2}$,
$D^A=((HO)(C_2H_3)C_6H_9(CH_2)_2(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, wherein R' is selected from the group consisting of hydrogen, methyl, and ethyl, and wherein j, k, l, m, n, p, x, y, z, and u are positive integers and j, k, l, n, p, u, and z may be zero; wherein $X_1$ and $X_2$ are selected from the group consisting of

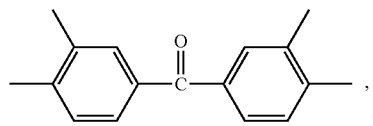

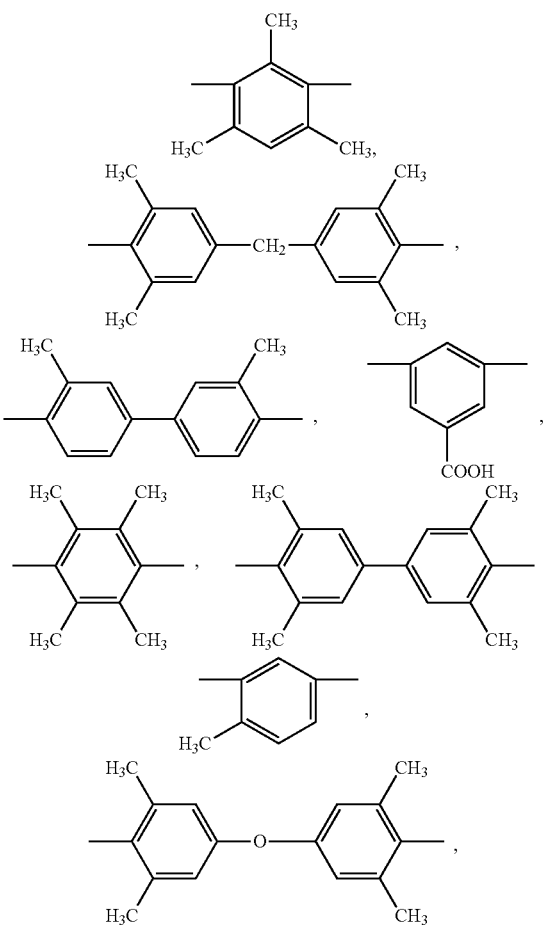

-continued

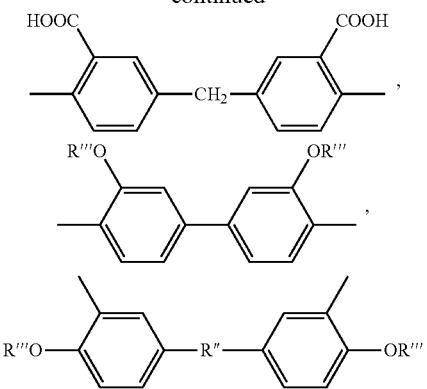

and mixtures thereof,
Y$_2$ is selected from the group consisting of

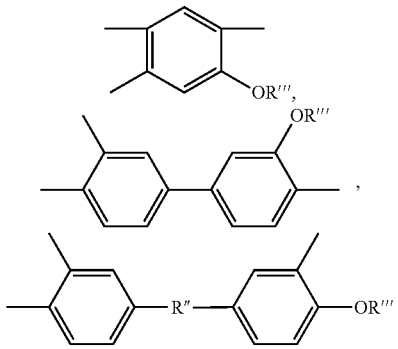

and mixtures thereof, R" is selected from the group consisting of

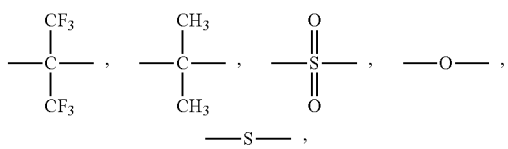

and mixtures thereof, and R'" is selected from the group consisting of —H, COCH$_3$, and mixtures thereof; and wherein a, b, and c are independent integers from 1 to 500.

2. The epoxysilicone-cross-linked polyimide membrane of claim 1 wherein in formula (I), X$_1$ and X$_2$ are selected from the group consisting of

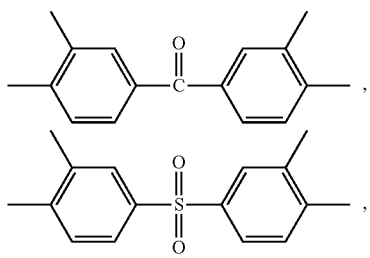

-continued

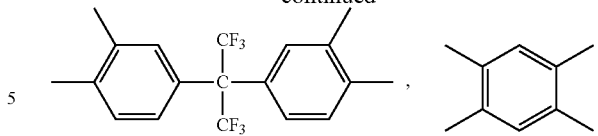

and mixtures thereof, respectively; and X$_1$ and X$_2$ are the same or different from each other.

3. The epoxysilicone-cross-linked polyimide membrane of claim 1 wherein in formula (I), Y$_2$ is

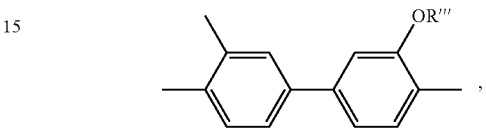

wherein R'" is selected from the group consisting of —H, COCH$_3$, and mixtures thereof.

4. The epoxysilicone-cross-linked polyimide membrane of claim 1 wherein in formula (I), R is selected from the group consisting of MD$_x$D$^E_y$M, M$^E$D$_x$D$^E_y$M$^E$, M$^E$D$_x$D$^E_y$M, and mixtures thereof; wherein
M=(CH$_3$)$_3$SiO$_{1/2}$,
M$^E$=

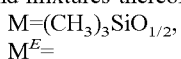
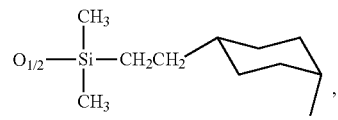

D=(CH$_3$)$_2$SiO$_{2/2}$,
D$^E$=

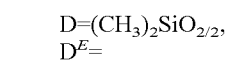
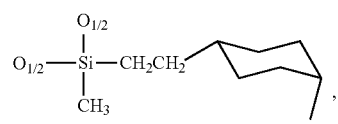

wherein x and y are positive integers.

5. The epoxysilicone-cross-linked polyimide membrane of claim 1 is in a form selected from an asymmetric integrally skinned membrane, a thin film composite (TFC) membrane or a hollow fiber membrane.

6. The epoxysilicone-cross-linked polyimide membrane of claim 5 wherein the thin film composite comprises a thin nonporous selective separation layer comprising an epoxysilicone-cross-linked polyimide polymer and a porous nonselective mechanical support layer made from a material different from the epoxysilicone-cross-linked polyimide polymer.

7. The epoxysilicone-cross-linked polyimide membrane of claim 6 wherein the porous nonselective mechanical support layer comprises a polymer selected from the group consisting of polysulfones, sulfonated polysulfones, polyethersulfones, sulfonated polyethersulfones, polyethers, polyetherimides, cellulosic polymers, polyamides, polyimides, polyether ketones, and mixtures thereof.

8. The epoxysilicone-cross-linked polyimide membrane of claim 1 wherein the polyimide polymer comprises poly (2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl), poly(2,2'-bis-(3,4-dicarboxyphenyl)hexatluoropropane dianhydride-3,3'-dihydroxy-4,4'-diamino-biphenyl-3,3'-diacetoxy-4,4'-diamino-biphenyl-3,5-diaminobenzoic acid).

9. The epoxysilicone-cross-linked polyimide membrane of claim 1 wherein in formula (I), $Y_1$ is selected from the group consisting of

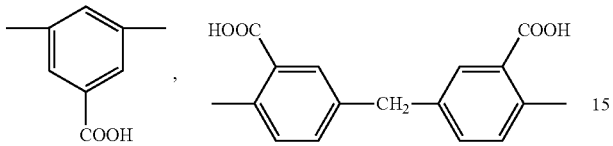

and mixtures thereof.

10. The epoxysilicone-cross-linked polyimide membrane of claim 1 wherein in formula (I), $X_1$ is

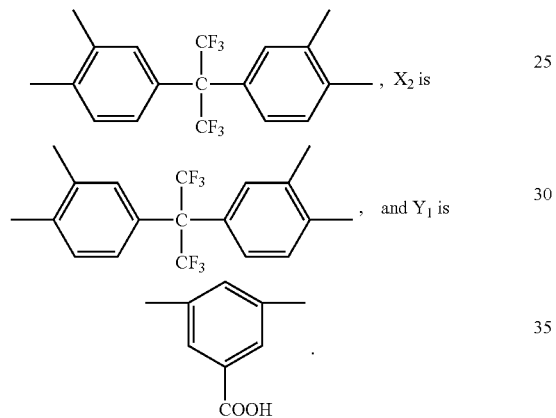

11. A process for separating at least one gas from a mixture of gases using an epoxysilicone-cross-linked polyimide membrane comprising an epoxysilicone-cross-linked polyimide polymer wherein said epoxysilicone-cross-linked polyimide polymer comprises a plurality of repeating units of formula (I), wherein formula (I) represented by a chemical structure

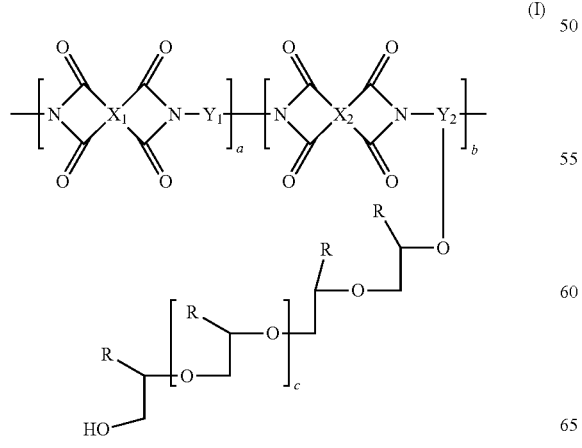

wherein R is selected from the group consisting of
$MD_xD^E{}_yQ_zT_uD^{Rf}{}_jD^A{}_kD^P{}_l(D'(CH(R')CH_2O)_m)_nD^B{}_pM$,
$M^ED_xD^E{}_yQ_zT_uD^{Rf}{}_jD^A{}_kD^P{}_l(D'(CH(R')CH_2O)_m)_nD^B{}_pM^E$,
$M^ED_xD^E{}_yQ_zT_uD^{Rf}{}_jD^A{}_kD^P{}_l(D'(CH(R')CH_2O)_m)_nD^B{}_pM$,
and mixtures thereof; wherein
$M=(CH_3)_3SiO_{1/2}$,
$M^E=$

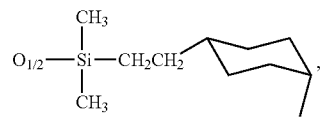

$D=(CH_3)_2SiO_{2/2}$,
$D'=(CH_3)_3SiO_{2/2}$,
$D^E=$

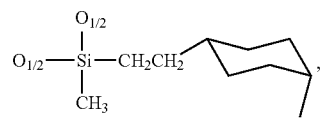

$D^{Rf}=(CF_3CH_2CH_2)(CH_3)SiO_{2/2}$,
$D^A=((HO)(C_2H_3)C_6H_9(CH_2)_2(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, wherein R' is selected from the group consisting of hydrogen, methyl, and ethyl, and wherein j, k, l, m, n, p, x, y, z, and u are positive integers and j, k, l, n, p, u, and z may be zero; wherein $X_1$ and $X_2$ are selected from the group consisting of

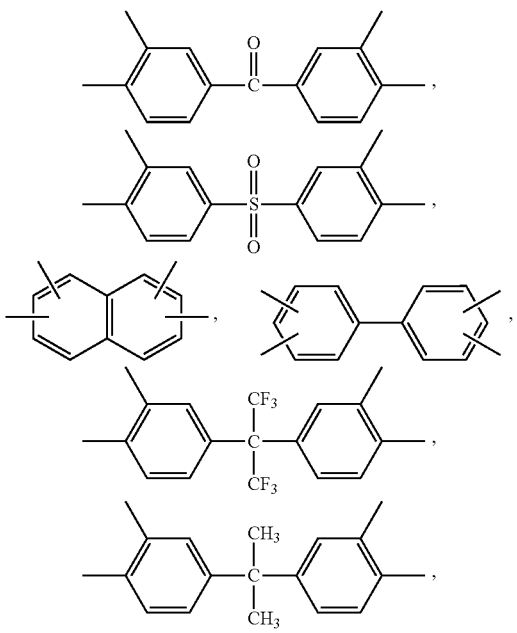

-continued

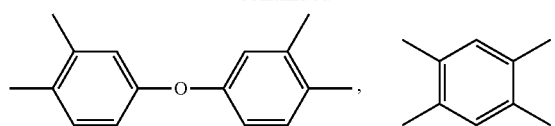

and mixtures thereof, respectively; $X_1$ and $X_2$ are the same or different from each other; wherein $Y_1$ is selected from the group consisting of

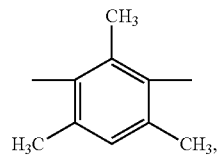

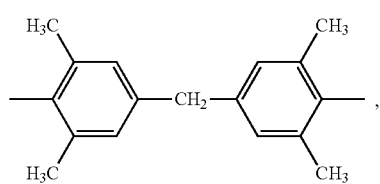

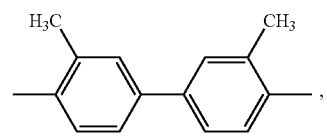

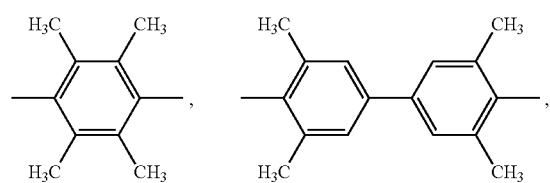

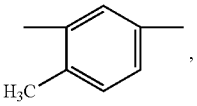

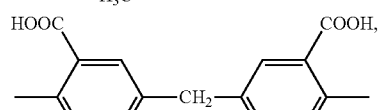

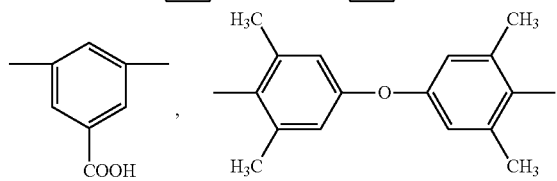

and mixtures thereof; $Y_2$ is selected from the group consisting of

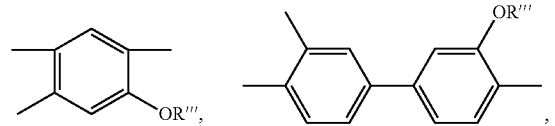

-continued

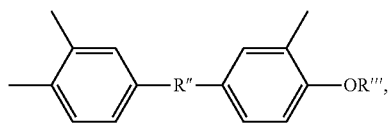

and mixtures thereof, R" is selected from the group consisting of

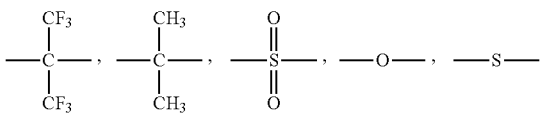

and mixtures thereof, and R''' is selected from the group consisting of —H, COCH$_3$, and mixtures thereof; and wherein a, b, and c are independent integers from 1 to 500, the process comprising:

(a) providing said epoxysilicone-cross-linked polyimide membrane described in the present invention which is permeable to said at least one gas;

(b) contacting the mixture on one side of said epoxysilicone-cross-linked polyimide membrane to cause said at least one gas to permeate the membrane; and (c) removing from the opposite side of the membrane a permeate gas composition comprising a portion of said at least one gas which permeated said membrane.

12. The process of claim 11 wherein in formula (I), $X_1$ and $X_2$ are selected from the group consisting of

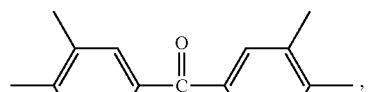

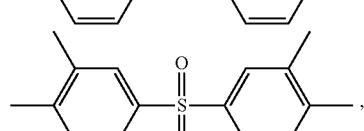

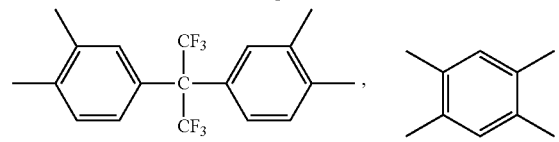

and mixtures thereof, respectively; and $X_1$ and $X_2$ are the same or different from each other.

13. The process of claim 11 wherein in formula (I), $Y_2$ is

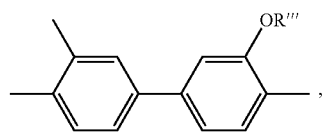

wherein R''' is selected from the group consisting of —H, COCH$_3$, and mixtures thereof.

14. The process of claim 11 wherein in formula (I), R is selected from the group consisting of $MD_xD^E_yM$, $M^ED_xD^E_yM^E$, $M^ED_xD^E_yM$, and mixtures thereof; wherein
$M=(CH_3)_3SiO_{1/2}$,
$M^E=$

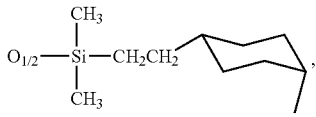

$D=(CH_3)_2SiO_{2/2}$,
$D^E=$

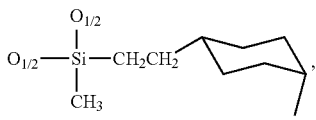

wherein x and y are positive integers.

15. The process of claim 11 wherein said mixture of gases is selected from the group consisting of volatile organic compounds in nitrogen or oxygen; carbon dioxide or hydrogen sulfide in natural gas; hydrogen, nitrogen, methane and argon; hydrogen in a mixture with hydrocarbons; olefins and paraffins; iso and normal paraffins; nitrogen and oxygen; carbon dioxide and methane; hydrogen arid methane; carbon monoxide, helium and methane; and carbon dioxide, oxygen, nitrogen, water vapor, hydrogen sulfide, helium and other trace gases in raw natural gas.

16. The process of claim 11 wherein said mixture of gases is separated at a temperature from about −20° to about 100° C. and a pressure from about 275 kPa to about 2.6 MPa.

17. The process of claim 11 wherein said mixture comprises hydrogen and methane.

18. The process of claim 11 wherein said mixture comprises carbon dioxide in natural gas.

19. The process of claim 11 wherein in formula (I), $Y_1$ is selected from the group consisting of

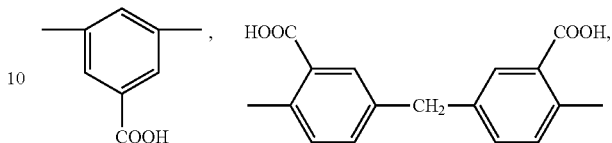

and mixtures thereof.

20. The process of claim 11 wherein in formula (I), $X_1$ is

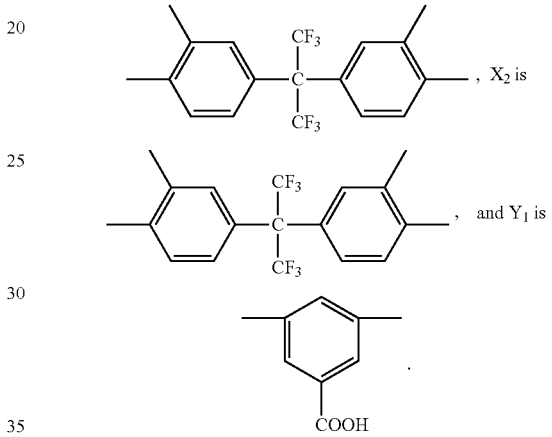

* * * * *